(No Model.)  2 Sheets—Sheet 1.
W. WEAVER.
MECHANICAL MOVEMENT.
No. 342,409.  Patented May 25, 1886.
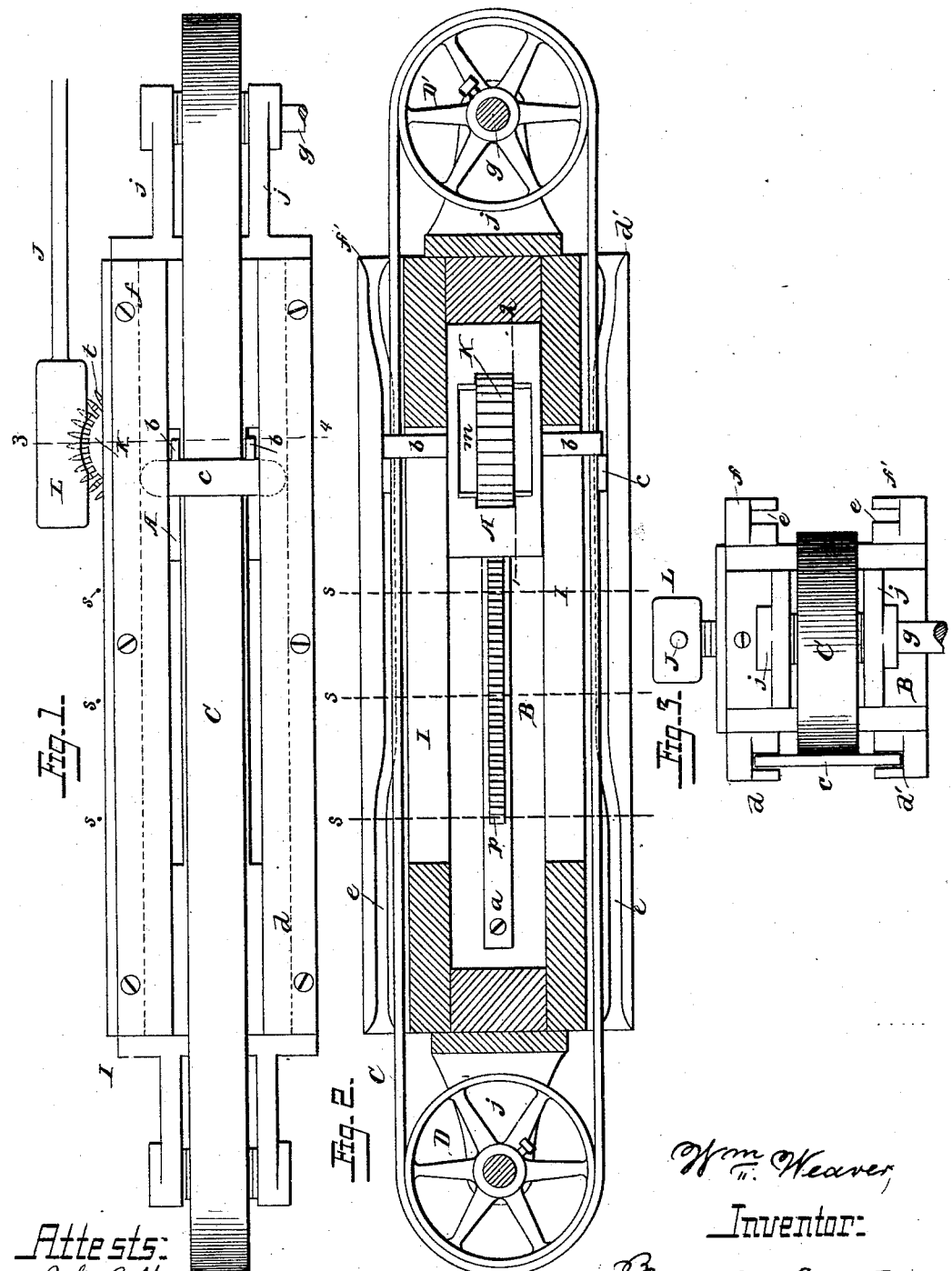
Attests:
John G. Hinkel
J. J. McCarthy
Wm. W. Weaver,
Inventor:
By Foster and Freeman
Attys.

(No Model.) 2 Sheets—Sheet 2.
W. WEAVER.
MECHANICAL MOVEMENT.
No. 342,409. Patented May 25, 1886.
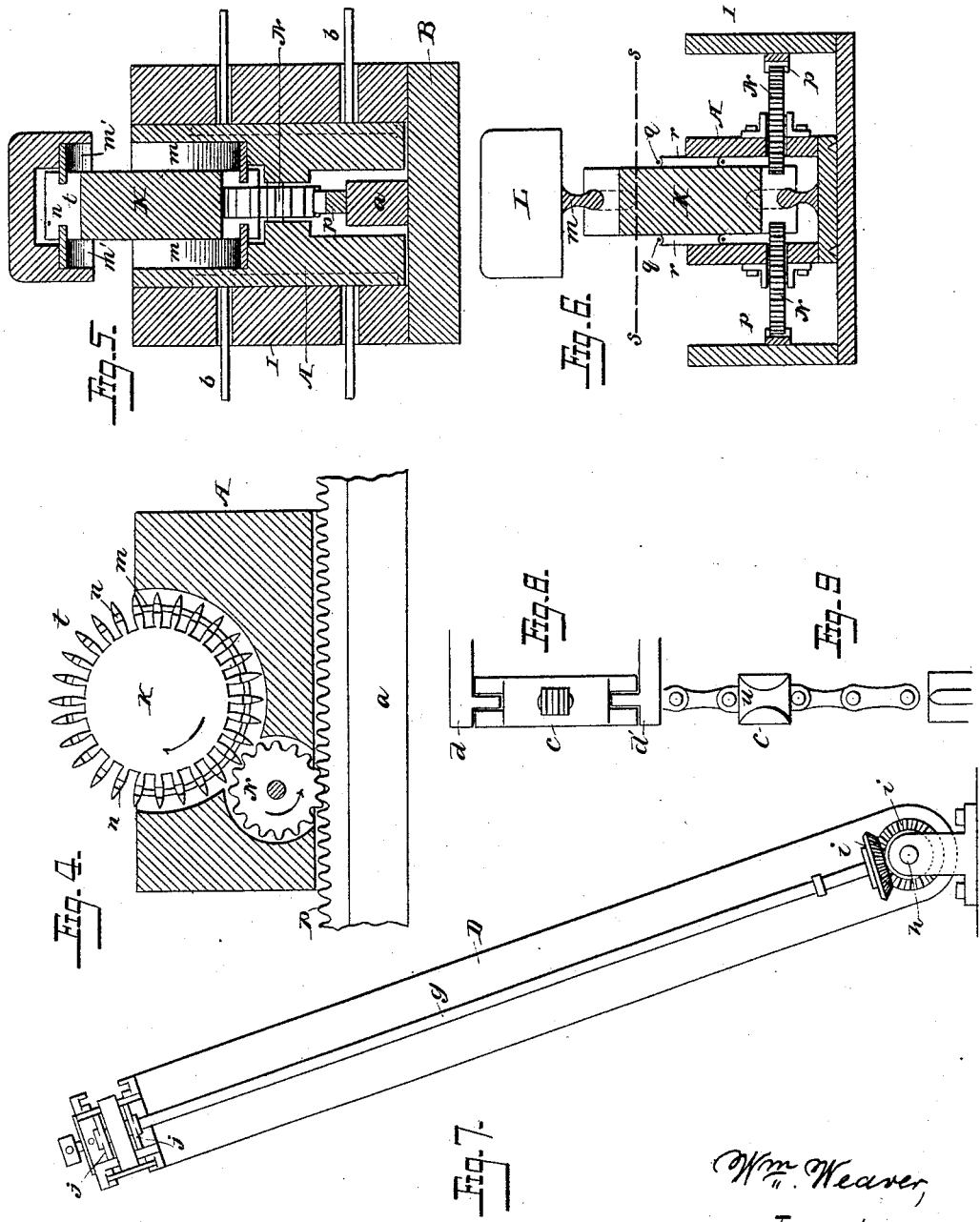

UNITED STATES PATENT OFFICE.

WILLIAM WEAVER, OF WESTPORT, CONNECTICUT.

MECHANICAL MOVEMENT.

SPECIFICATION forming part of Letters Patent No. 342,409, dated May 25, 1886,

Application filed October 22, 1885. Serial No. 180,671. (No model.)

*To all whom it may concern:*

Be it known that I, WILLIAM WEAVER, a citizen of the United States, and resident of Westport, in the county of Fairfield and State of Connecticut, have invented certain new and useful Improvements in Mechanical Movements, of which the following is a specification.

My invention has for its object to impart a reciprocating motion to any body or thing to be moved from a band traveling continuously in one direction, and, further, to connect a reciprocating object to another object or thing to be moved by a positive connection without interfering with the traverse of the connecting bodies over and across transverse rods, bars, or similar objects lying in the path of the connecting devices, and these objects I effect by means of the appliances hereinafter fully described, and illustrated in the accompanying drawings, in which—

Figure 1 is a side elevation of devices embodying my improved mechanical movements. Fig. 2 is a sectional plan of Fig. 1. Fig. 3 is an end view of Fig. 1. Fig. 4 is a sectional elevation on the line 1 2, Fig. 2. Fig. 5 is an enlarged sectional elevation on the line 3 4, Fig. 1. Fig. 6 is a modification of the parts shown in Fig. 5. Fig. 7 is an elevation showing the application of the mechanical movement to a swinging frame. Fig. 8 is an end view illustrating a modification of the guides. Fig. 9 is a plan of the parts shown in Fig. 8.

A represents the part or thing to which a reciprocating motion is to be imparted, which may be any part or object used in mechanism of various kinds, and which for present purposes is in the shape of a rectangular block, and will therefore be termed a "reciprocating" block. The said block may be guided by any suitable support or supports—as, for instance, parallel side rods or tracks arranged beneath, and upon which it rests—one support illustrated in the drawings being a plate, B, which I term the "bed," and a central rib, *a*, fitting a corresponding recess in the block, serves to guide it in a straight path upon the bed; but the rib or other guiding device may be curved so as to carry the block in a curved track.

For imparting motion back and forth to the block, I use one or more continuous bands, belts, or chains, C, which extend upon opposite sides of the block A, and round two or more band wheels or pulleys, D D'; and I provide the endless band with one or more bearings adapted to engage with shoulders upon the block, or with brackets or projections *b*, extending therefrom.

In the drawings the band is provided with a single bearing, *c*, consisting of a bar riveted to and projecting beyond the edges of the band, so as to make contact with the ends of two brackets, *b b*, projecting from each side of the block. As the pulleys revolve in either direction the block remains stationary until the bearing *c* is brought in contact with the bearings *b* at one side, after which the block and the band will travel together until the bearing *c* passes from contact with the bearing *b*, when the block will cease its movement in that direction, and it will be carried in the opposite direction as the bearing *c* is brought by the travel of the band into contact with the brackets at the opposite side of the block.

Different means may be employed for removing the bearing *c* from contact with the shoulder or bearing upon the block. For instance, the two may be in frictional contact, so that they will travel together until the block comes in contact with a positive stop, when the bearing will move away from the bracket. I prefer, however, to disconnect the parts by carrying the bearing out of position, so as to pass beyond the bracket. One means of effecting this is shown in the drawings, and consists in combining with the parts already described four guides, *d d' f f'*, having grooves *e*, which for the greater portion of their length are parallel with the straight sides of the belt, the guides being arranged above and below the bar *c*, the ends of which extend into the grooves, as shown in Fig. 2, so that as the bar moves with the belt it will travel in a straight course and in contact with the brackets *b*; but the ends of the guide-grooves are curved outward, as shown in Fig. 3, so that as the block A nears the end of its course the bar *c* will be carried outward and away from the brackets *b*, the belt swinging outward to accommodate this movement, after which the bar will travel with the belt until it is brought in contact with the brackets at the opposite side, and the above-described movements may be repeated. By this means a positive reciprocating movement is imparted to the block from the continuous rotation of the pulleys D D', one of which may be secured to the driving-shaft $g$.

To insure the entrance of the bearing-bar $c$ into the groove $e$ as the bar approaches the guide, the said groove is made with an expanded or widened mouth, as shown in plan, Fig. 3.

It is sometimes necessary in certain classes of machinery to reciprocate an object upon a swinging frame—as, for instance, in looms, Fig. 7, where the block A is to be reciprocated upon a frame, D, swinging upon a pivot or shaft, $h$. This may be effected by mounting the guiding-shaft $g$ in bearings at one side or end of the frame D, and providing it with a bevel-gear, $i$, engaging with a bevel-gear, $i'$, upon the pivotal shaft $h$, so that the rotation of the shaft $h$ will rotate the shaft $g$ without interference or interfering with the swinging of the frame upon its pivot.

The pulleys D D' may be mounted upon any suitable bearings so arranged that the parallel sides of the belt will inclose the path of the block A. As shown, the brackets $j$, which support the shafts of the pulleys, are secured to the opposite ends of a long narrow box, I, which supports the bed, or the lower side of which constitutes the bed, and also supports the guides $d\ d'\ f\ f'$.

Any suitable connection may extend between the block A and any part to be reciprocated or moved thereby.

In some instances it is desirable to transfer the reciprocating motion of the block A to a part which shall be in positive connection with the block, but across a fixed bar or other object. For instance, a bar or rod, J, must be carried back and forth with the block A while the two are positively connected; but the movement must be across one or more fixed bars, rods, cords, or other objects, $s$. To effect this I provide the block A with a bladed wheel, K, so constructed that the wheel will revolve with its blades always locked to both the block A and the head L of the rod J, the bars $s$ being so arranged as to be caught between the teeth or blades of the wheel K as the latter is carried with the block A, and to lie between these teeth as the wheel revolves and travels, so that the traverse of the wheel and its attached parts may be effected across the bars without interference with or moving the latter.

The blades $t$ of the wheel K may be differently formed, so as to be in locked connection with the block while the wheel revolves. For instance, each blade may have notches $n\ n$ in its opposite side edges, adapted to receive curved plates $m\ m'$, arranged upon opposite sides of the wheel and secured to the block A and head L, as shown in Fig. 5. These curved plates or bearings lock the wheel both to the block and to the head, but permit it to turn freely independently of the block and head. The bars $s$ are so arranged as to be in the path of the teeth of the wheel, which will move across the bars back and forth as the block is reciprocated, as before described.

Different means may be employed for turning the wheel with a positive movement. Thus a toothed wheel or pinion, N, is carried by the block A and gears with a rack, $p$, upon the bed, so that as the block travels to the left, Fig. 4, the wheel K will be revolved in the direction of its arrow, the motion being reversed when the block travels to the right.

The curved bearings $m\ m'$, instead of consisting of strips or plates entering notches at the sides of the plates or blades $t$, may be curved ribs entering notches in the ends of the blades, as shown in Fig. 6, and in this case the toothed wheels or pinions N may be arranged to turn in horizontal planes and gear with racks $p$ at the sides of the block, as shown in Fig. 6. In other cases the wheel K may be turned by means of stationary cords $q$, Fig. 6, fastened at the ends and coiled round grooved hubs $r$ at the sides of the wheel, the friction of the cords and hubs turning the wheel.

The guides for the bearing or bar $c$ may consist of ribs, instead of grooves, as shown in Figs. 8 and 9, in which case the bar $c$ has notches $u$ in the ends to receive the ribs, and these notches are widened toward the end faces of the bar, so as to insure the guiding of the bar onto the ribs.

In some cases the bar, instead of being secured at one side to the band or chain, may be introduced in the latter as one of the connecting-links, as shown in Fig. 9.

Without limiting myself to the precise construction and arrangement of parts shown, I claim—

1. The within-described means of converting a rotary into a reciprocating motion, consisting of an endless band traversing in one direction and provided with a bearing, a guided block arranged between the parallel sides of the band and provided with shoulders for making contact with the bearing, and means, substantially as described, for removing the bearing from contact with its shoulder when the block reaches the limit of its movement, substantially as set forth.

2. The combination of the endless band traveling in one direction upon pulleys, a block guided to travel between the parallel sides of the band, a bearing upon the band arranged to make contact with shoulders upon the block, and guides arranged to deflect the bearing from the shoulders at the points where the movements of the block must be arrested, substantially as set forth.

3. The combination of the reciprocating block A, wheels D D', carrying an endless band provided with a bearing-bar, $c$, and guides $f$ $f'\ d\ d'$, substantially as set forth.

4. The combination of the guided block traversing endless band having a bearingpiece, and guides having grooves curved outward and expanded at the ends, substantially as described.

5. The combination, with a reciprocating block and a part, as a head, to be moved positively therewith, of a toothed wheel revolving upon bearings on the block and provided with notches in the wheel-teeth, receiving a curved bearing upon the head, arranged to permit the wheel to turn while the head and block move in right lines parallel to each other, substantially as set forth.

6. The combination of the head and block, a wheel provided with teeth notched to receive bearings upon the head and block, and positively connecting the two while revolving independently thereof, substantially as set forth.

7. The combination of the reciprocating block, a toothed wheel supported thereby and having its teeth extending above the top thereof, a head having curved bearings adapted to notches in the teeth, substantially as set forth.

8. The combination of the reciprocating block and head, toothed wheel connecting the two, and stationary bars $s$, arranged to be traversed by the bladed portion of the wheel, substantially as set forth.

9. The combination of the reciprocating block carrying a toothed wheel and pinion, a rack engaging with said pinion, and head having bearings adapted to the notched teeth of the wheel, substantially as described.

In testimony whereof I have signed my name to this specification in the presence of two subscribing witnesses.

WM. WEAVER.

Witnesses:
E. H. WEAVER,
H. C. WOODWORTH.